US007242276B2

(12) United States Patent
Usui

(10) Patent No.: US 7,242,276 B2
(45) Date of Patent: Jul. 10, 2007

(54) METHOD AND SYSTEM FOR UNLOCKING DOORWAY

(75) Inventor: Toshiyuki Usui, Yokohama (JP)

(73) Assignee: Alpha Corporation, Yokohama-Shi, Kanagawa (JP)

( * ) Notice: Subject to any disclaimer, the term of this patent is extended or adjusted under 35 U.S.C. 154(b) by 153 days.

(21) Appl. No.: 10/362,161

(22) PCT Filed: Aug. 30, 2001

(86) PCT No.: PCT/JP01/07489

§ 371 (c)(1),
(2), (4) Date: Feb. 21, 2003

(87) PCT Pub. No.: WO02/19277

PCT Pub. Date: Mar. 7, 2002

(65) Prior Publication Data

US 2003/0167396 A1 Sep. 4, 2003

(30) Foreign Application Priority Data

Aug. 31, 2000 (JP) .......................... P2000-264271
Aug. 31, 2000 (JP) .......................... P2000-264274

(51) Int. Cl.
*G05B 19/00* (2006.01)

(52) U.S. Cl. ...................................... 340/5.53; 340/5.2

(58) Field of Classification Search ................. 340/5.2, 340/5.82, 5.53, 5.83, 5.7, 5.52, 5.22, 5.21, 340/5.8; 713/186; 382/125, 127
See application file for complete search history.

(56) References Cited

U.S. PATENT DOCUMENTS 5,083,122 A * 1/1992 Clark ........................ 340/5.22
6,980,672 B2 * 12/2005 Saito et al. ................. 382/124

FOREIGN PATENT DOCUMENTS

| | | |
|---|---|---|
| DE | 196 12 156 | 10/1997 |
| EP | 0 924 655 | 6/1999 |
| GB | 2 345 371 | 7/2000 |
| JP | WO9934080 | * 7/1999 |

* cited by examiner

*Primary Examiner*—Wendy R. Garber
*Assistant Examiner*—M Shimizu
(74) *Attorney, Agent, or Firm*—Nath & Associates, PLLC; Gregory B. Kang; Derek Richmond

(57) ABSTRACT

An unlock system does not use a key that might be copied so that only a correct person can unlock a door and security is enhanced. Unlock records of door-lock are stored in a limited memory capacity in volume.

Fingerprint data input to a fingerprint input section 21 disposed outside a door 11 provided on a doorway 10 is detected, and the detected fingerprint data is verified against previously registered fingerprint data. If it was confirmed that the detected fingerprint data coincided with the registered fingerprint data, an unlock signal is output to unlock the door-lock. At the same time, an identification code of the registered fingerprint data that unlocked is stored.

9 Claims, 6 Drawing Sheets

METHOD AND SYSTEM FOR UNLOCKING DOORWAY

TECHNICAL FIELD

The present invention relates to an unlock method and an unlock system applied to a doorway of a building for example.

BACKGROUND ART

In order to unlock a door-lock of a doorway of a building such as a stand-alone house, an apartment such as a condominium research/development facility and an office building, a normal key, i.e., a latch key or notch key, and a corresponding lock unit are used. A normal key is used also for locking the door of the doorway of each portion in the building.

DISCLOSURE OF INVENTION

However, the normal key which has been conventionally used is easily lost and easily be copied. Therefore, unless a user keep carrying the key any time and anywhere, it is not possible to deny a possibility that the key is copied and illegally used without the user's knowing. That is, there is a problem that even if the door-lock was unlocked using a normal key, it is not clear whether the user himself or herself unlock the lock or a copied key was illegally used.

The present invention provide a lock method and an unlock system of a doorway in which the problem of the conventional unlock system is eliminated, a conventional normal key that might be copied is not used for unlocking a door-lock provided on a doorway, only the user can unlock so that a reliability is enhanced, and unlock record of the door-lock can be saved in high volume.

According to a first technical aspect of the present invention, in a method for unlocking door-lock provided on a doorway, fingerprint data input to a fingerprint input section disposed outside a door is detected, the detected fingerprint data is verified against fingerprint data that was previously registered together with an identification code, and if it was confirmed that the detected fingerprint data coincided with the registered fingerprint data, an unlock signal is output to unlock the door-lock and the identification code of the registered fingerprint data is stored.

According to a second technical aspect of the invention, a plurality of fingerprint data is registered as registered fingerprint data such that the fingerprint data can be identified by identification codes having much smaller data amount as compared with the fingerprint data, and when the detected fingerprint data coincided with any one of the plurality of registered fingerprint data, the unlock signal is output to unlock the door-lock, and an identification code of the coincided one registered fingerprint data is stored.

According to a third technical aspect of the invention, if it was confirmed that the detected fingerprint data coincided with the registered fingerprint data, the unlock signal is output to unlock the door-lock, and the fingerprint data that unlocked is stored in a storing section having a data function or a clock function that can set the fingerprint data that unlocked.

BEST MODE FOR CARRYING OUT THE INVENTION

Figures 1A, 1B, 1C:
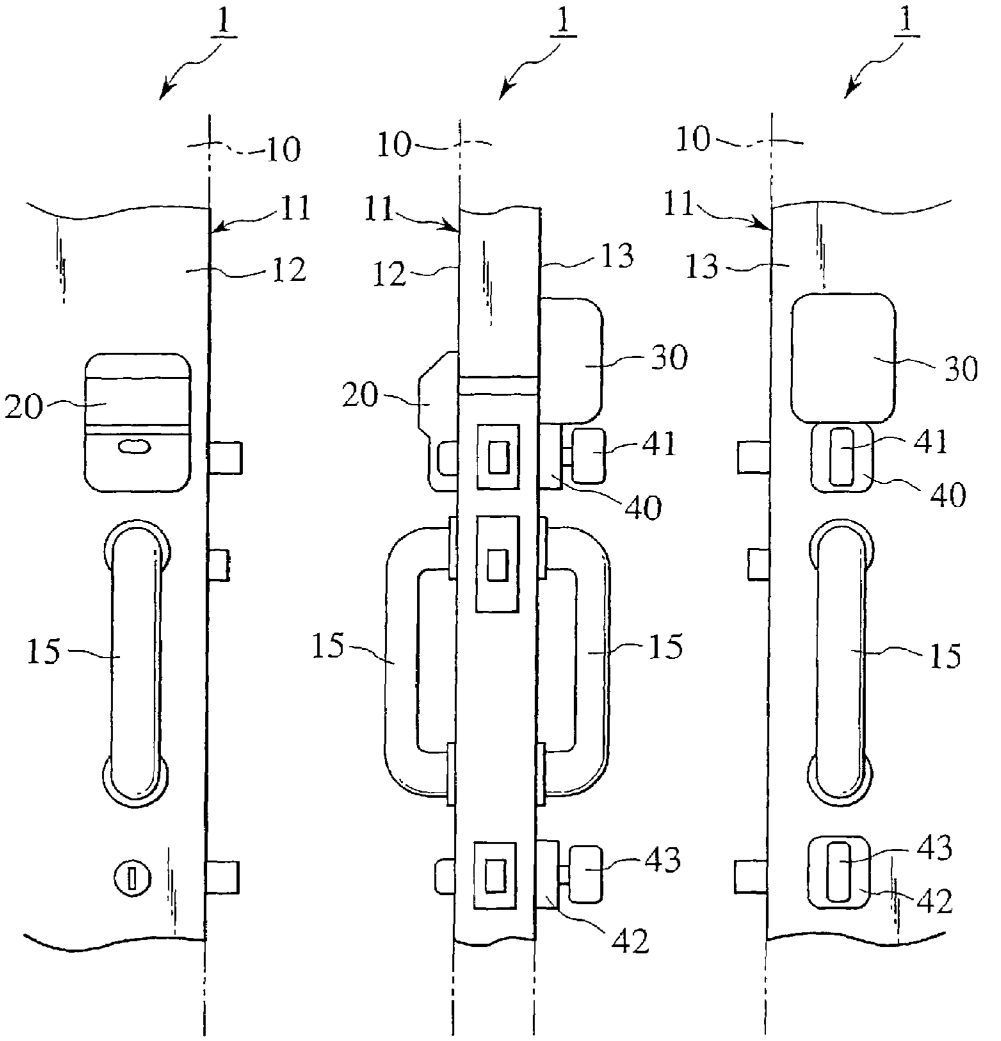
FIG. 1 are views showing structures of an embodiment of an unlock system of a doorway, wherein (a) is a view of the structure as seen from outside of a door, (b) is a view of the structure as seen from an end surface of the door, and (c) is a view of the structure as seen from inside of the door.

Embodiment of the invention will be explained with reference to the drawings. FIG. 1 are views showing structures of an embodiment of an unlock system of a doorway. An unlock system 1 of a doorway comprises an operation unit 20 mounted to an outer side 12 of a door 11, a control unit 30 mounted to an inner side 13 of the door 11, and a lock unit 40 having a knob 41 on the inner side 13 of the door 11. A reference number 15 represents door handles mounted on opposite sides of the door 11. Reference numbers 42 and 43 represent an operation knob and a lock unit corresponding to a normal key.

Figure 2:
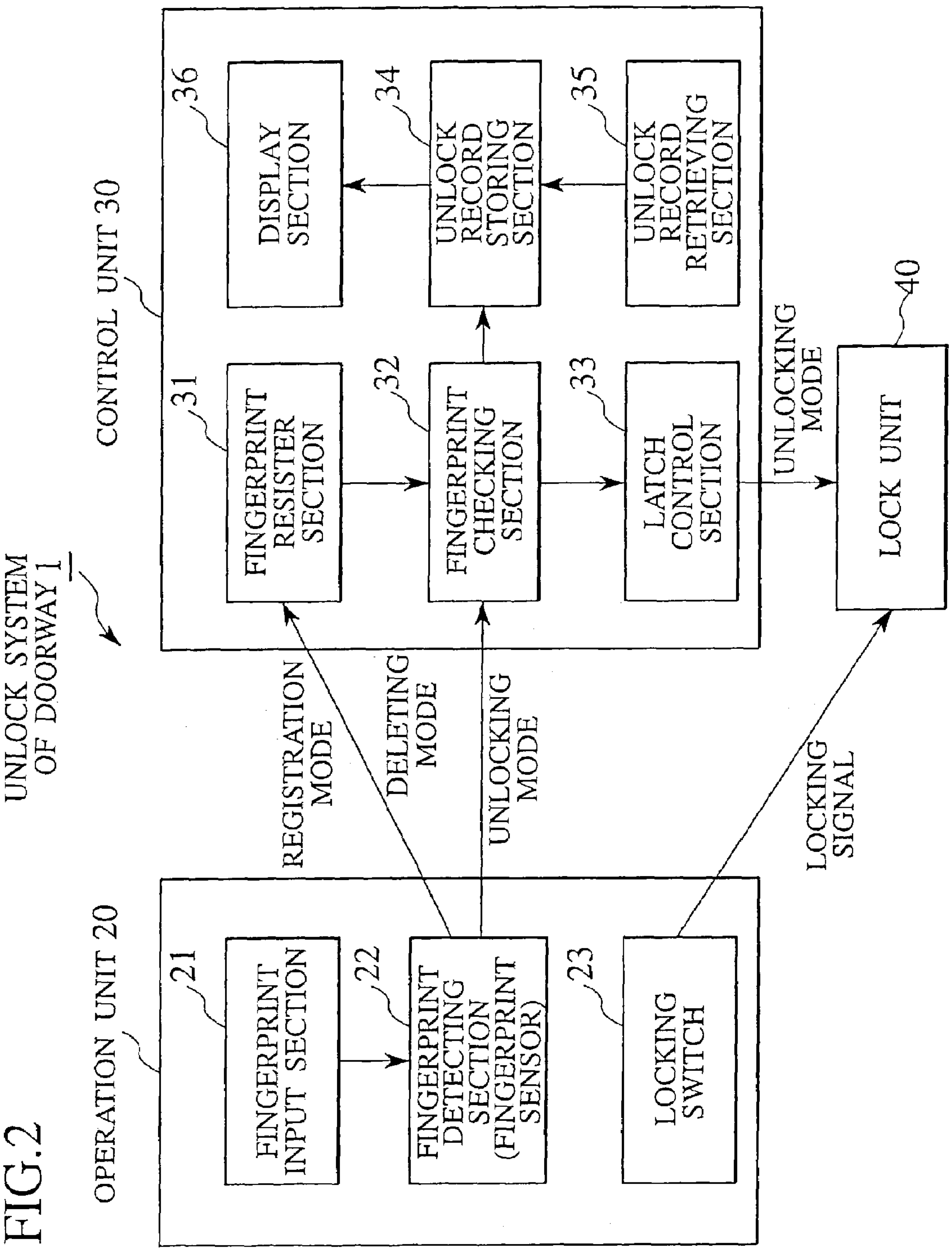
FIG. 2 is a block diagram showing an embodiment of the unlock system of entrance.

FIG. 2 is a block diagram of the unlock system 1 of the doorway. The operation unit 20 comprises a fingerprint input section 21, a fingerprint detecting section (fingerprint sensor) 22 and a locking switch 23. The control unit 30 comprises a fingerprint resister section 31, a fingerprint verifying section 32, a latch control section 33, an unlock record storing section 34, an unlock record retrieving section 35 and a display section 36. Necessary electric power is supplied from a battery or appropriate DC power supply to each part of the operation unit 20, each part of the control unit 30 and each part of the lock unit 40, and this state is not illustrated in the drawings.

Figure 3:
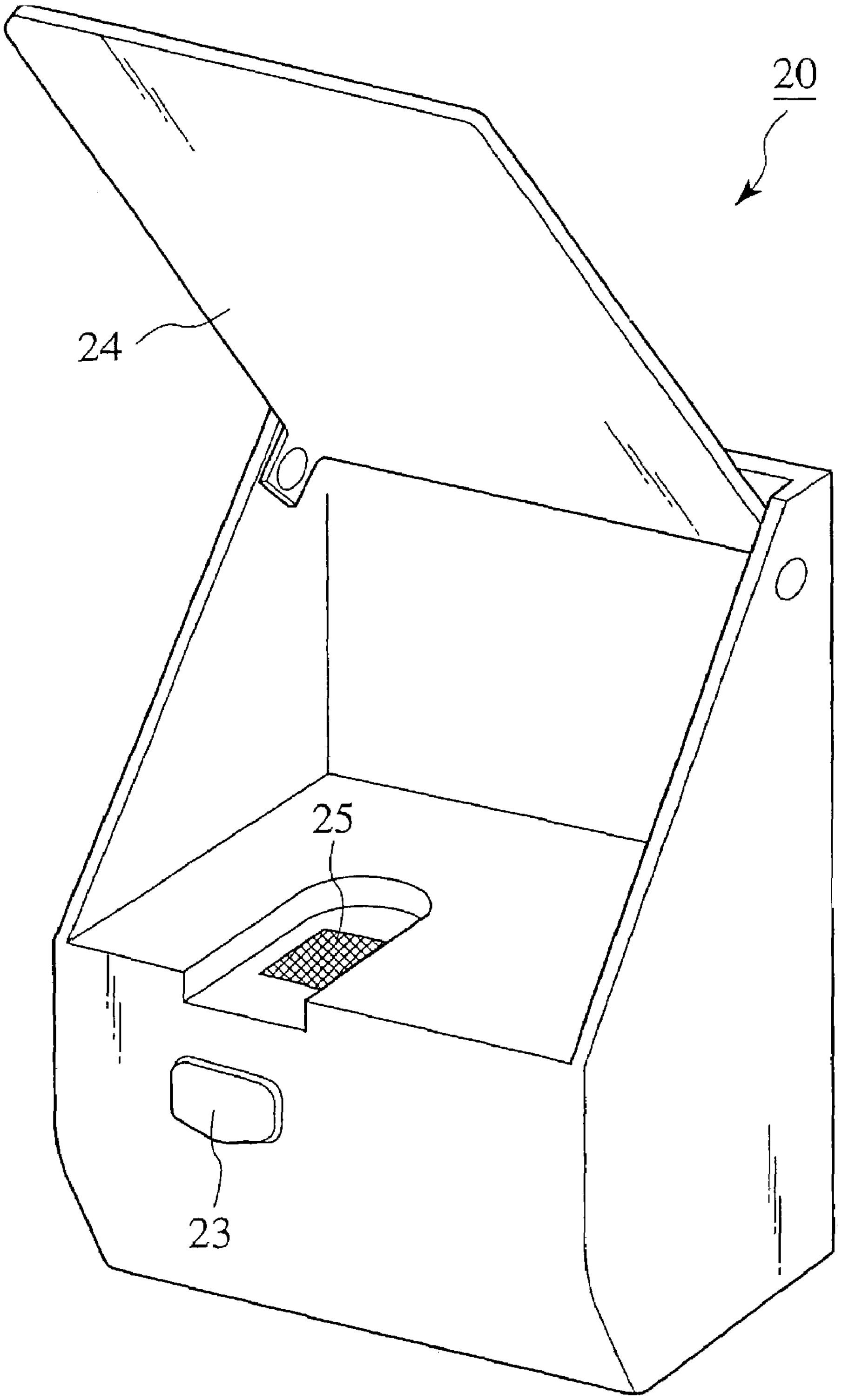
FIG. 3 is a explanatory perspective view of an operation unit.

As shown in FIG. 3, according to the operation unit 20, if a cover 24 is opened, a fingerprint input surface 25 of the fingerprint input section 21 appears. If a user puts his or her finger on the fingerprint input surface 25, the fingerprint input section 21 becomes ON. If an input fingerprint data is detected by the fingerprint detecting section (fingerprint sensor) 22, the detected fingerprint data is transmitted to a fingerprint verifying section 32 of the control unit 30.

If the locking switch 23 is pushed, the operation unit 20 transmits a lock signal to the lock unit 40. With this signal, if the key is unlocked, the lock unit 40 locks electrically.

The control unit 30 is in an unlocking operation mode by fingerprint data input in its normal state, but the control unit 30 is switched to a register/delete operation mode of fingerprint data by an appropriate operation. That is, in the case of the register/delete operation mode of the fingerprint data, if the fingerprint data detected by the operation unit 20 is sent from the fingerprint detecting section (fingerprint sensor) 22 to the fingerprint resister section 31, the fingerprint data is registered together with the identification code in the fingerprint resister section 31. If an arbitrary identification code is designated and deleting operation is carried out, a fingerprint data corresponding to the identification code is deleted together with the identification code.

When the control unit 30 is in the unlocking operation mode by a normal fingerprint data input, if a fingerprint data detected by the operation unit 20 is sent from the fingerprint detecting section (fingerprint sensor) 22 to the fingerprint verifying section 32, the fingerprint data is verified against a fingerprint data that was previously registered in the fingerprint resister section 31. If a plurality of registered fingerprint data exist, the fingerprint data is verified against the registered fingerprint data one by one. If the detected fingerprint data coincides with any one of the registered fingerprint data, the fingerprint verifying section 32 sends a coinciding signal to the latch control section 33, and with this signal, the latch control section 33 sends the unlock signal to the lock unit 40 to lock the key electrically.

In the control unit 30, when the detected fingerprint data coincides with any one of the registered fingerprint data, the fingerprint verifying section 32 sends the identification code to the unlock record storing section 34 to store the identification code.

Here, the reason why the identification code is registered together with the fingerprint data in the fingerprint resister section 31 is that a large volume of unlock records are stored without consuming the memory capacity of the unlock record storing section 34 meaninglessly. That is, as compared with the fingerprint data, the data amount of the identification code expressed with number (decadic number) or symbols for example is extremely smaller. Therefore, if ten kinds of fingerprint data are registered without using the identification code, and all unlock records of 100 times or 1000 times are stored with fingerprint data, the memory capacity of the unlock record storing section 34 must be 10 times or 100 times greater than that of the fingerprint resister section 31.

Whereas, in order to register ten kinds of fingerprint data with the identification codes, the memory capacity of the fingerprint resister section 31 must be slightly increased, but a memory capacity of the unlock record storing section 34 required for storing all of the 100 times or 1000 times unlock records with identification codes is much smaller than a memory capacity of the fingerprint resister section 31. Therefore, a large volume of unlock records more than 100 times or 1000 times records can be stored even if a limited memory capacity is used as the unlock record storing section 34.

The identification codes stored in the unlock record storing section 34 are displayed on the display section 36. by retrieving by the unlock record retrieving section 35. Therefore, if time is specified and retrieval is conducted by the unlock record retrieving section 35, it is possible to confirm a person of the fingerprint data who unlocked the lock at the specific time retrospectively. Therefore, this unlock system is preferable for a doorway 10 in which many people unlock the door-lock many times a day.

Further the lock unit 40 can be locked and unlocked by turning an operation knob 41 from the inner side 13 of the door 11.

Figure 4:
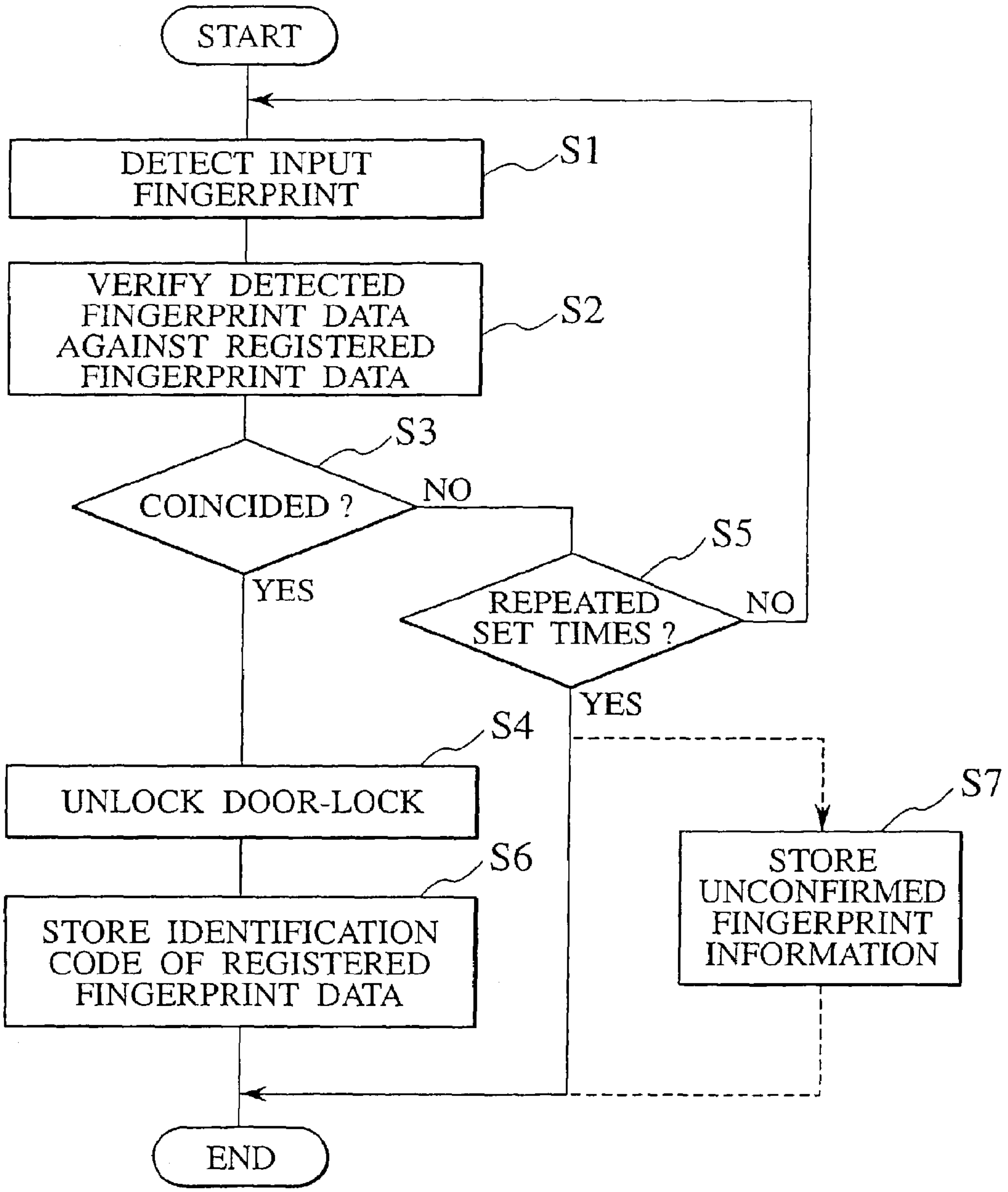
FIG. 4 is a flowchart showing a motion in FIG. 2.

Next, the operation of the above embodiment will be explained using a flowchart shown in FIG. 4. When a door-lock is unlocked from outer side 12 of the door 11, first, the cover 24 of the operation unit 20 is opened, a user puts his or her finger on the fingerprint input surface 25 and inputs the fingerprint data. Then, the fingerprint data input to the fingerprint input section 21 is detected by the fingerprint detecting section (fingerprint sensor) 22 (step 1).

Then, the detected fingerprint data is sent to the fingerprint verifying section 32 of the control unit 30 from the fingerprint detecting section (fingerprint sensor) 22, and the fingerprint verifying section 32 verifies the fingerprint data against fingerprint data which were previously registered in the fingerprint resister section 31 (step S2).

If the detected fingerprint data coincided with any one of the registered fingerprint data (YES in step S3), the lock unit 40 receives the unlock signal from the latch, control section 33 to unlock the door-lock electrically (step S4). At that time, it is preferable to inform of the unlock by a buzzer.

On the other hand, if the detected fingerprint data did not coincide with the registered fingerprint data (NO in step S3), input of the fingerprint data is again required up to a preset times (e.g., three times) (step S5). At that time, it is preferable to inform the user to again input the fingerprint data by a warning buzzer. When it was judged that the input was repeated preset times, the unlock operation is completed. A procedure (step S7) to store a fingerprint data detected in this case in the unlock record storing section 34 as an unconfirmed fingerprint data, or to store information that the fingerprint data is unconfirmed in the unlock record storing section 34 may be added. With this step, the unconfirmed fingerprint data can be verified when the unlock record is searched in the future.

When the lock unit 40 unlocked the door-lock electrically (step S4), the fingerprint verifying section 32 sends an identification code of the coincided registered fingerprint data to the unlock record storing section 34 and the latter stores the identification code (step S6) at the same time. Therefore, it is possible to confirm a person of the fingerprint data who unlocked the lock at a specific data retrospectively by specifying the time and by retrieving the identification codes stored in the unlock record storing section 34 by the unlock record retrieving section 35. Therefore, this unlock system is preferable for a doorway 10 in which many people unlock the door-lock many times a day.

Although the invention is applied to the door 11 provided on the doorway 10 of the building in this embodiment, the invention is not limited to this, and for example the invention can be applied to a door or similar structure provided on a doorway of each portion in a building.

According to the embodiment, when the door-lock provided on the doorway is unlocked, an identification system using no normal key that might be copied is employed. Therefore, the lock can be unlocked only by a correct person, and high reliability can be secured. Further, not only the fingerprint data, but also the identification code specifying the fingerprint data are stored as associated information. Thus, memory capacity per one data can largely be saved, and a large volume of unlock records of door-lock can be stored in a limited memory capacity. The unlock system can be applied to a doorway in which many people unlock the door-lock many times a day, it is possible to confirm a person of fingerprint data who unlocked the lock, or to confirm when a person having an unconfirmed fingerprint unlock the key retrospectively.

Another Embodiment

Figure 5:
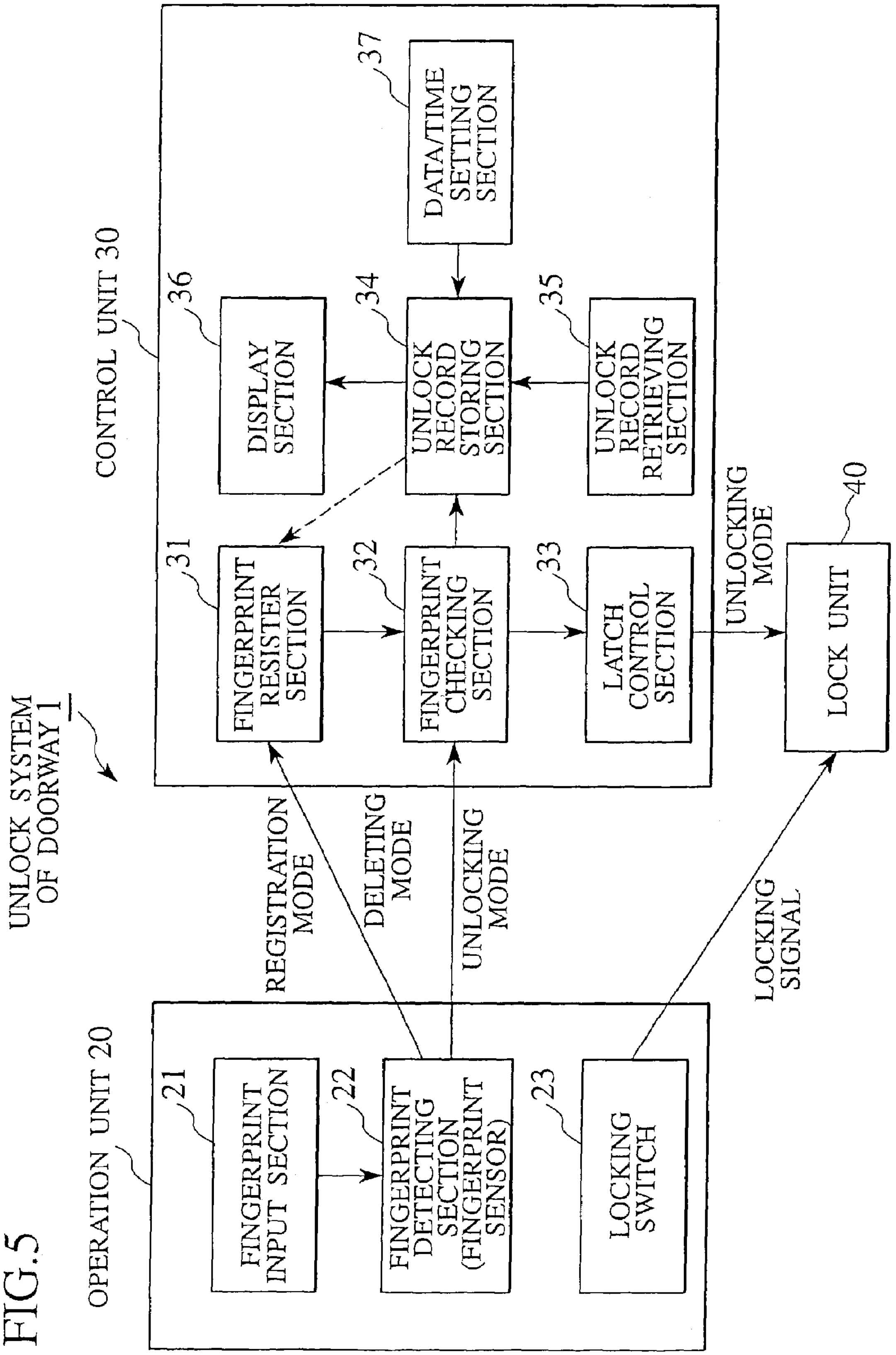
FIG. 5 is a block diagram showing another embodiment of the unlock system of the doorway.

FIG. 5 is a block diagram of an unlock system 1 of a doorway according to another embodiment of the invention, and constituent elements corresponding to those of the unlock system in FIG. 2 are designated with the same numbers. An operation unit 20 comprises a fingerprint input section 21, a fingerprint detecting section (fingerprint sensor) 22 and a locking switch 23. A control unit 30 comprises a fingerprint resister section 31, a fingerprint verifying section 32, a latch control section 33, an unlock record storing section 34, a date/time setting section 37, a display section 36 and unlock record retrieving section 35. Necessary electric power is supplied from a battery or appropriate DC power supply to each part of the operation unit 20, each part of the control unit 30 and each part of the lock unit 40. A structure of the operation unit 20 is the same as that shown in FIG. 2 and thus, explanation thereof is omitted here.

The control unit 30 is in an unlocking operation mode by fingerprint data input in its normal state, but the control unit 30 is switched to a register/delete operation mode of fingerprint data by an appropriate operation. That is, in the case of the register/delete operation mode of the fingerprint data, if the fingerprint data detected by the operation unit 20 is sent from the fingerprint detecting section (fingerprint sensor) 22 to the fingerprint resister section 31, the fingerprint data is registered together with the identification code in the fingerprint resister section 31. If an arbitrary identification code is designated and deleting operation is carried out, a fingerprint data corresponding to the identification code is deleted together with the identification code.

When the control unit 30 is in the unlocking operation mode by a normal fingerprint data input, if a fingerprint data detected by the operation unit 20 is sent from the fingerprint detecting section (fingerprint sensor) 22 to the fingerprint verifying section 32, the fingerprint data is verified against a fingerprint data that was previously registered in the fingerprint resister section 31. If a plurality of registered fingerprint data exist, the fingerprint data is verified against the registered fingerprint data one by one. If the detected fingerprint data coincides with any one of the registered fingerprint data, the fingerprint verifying section 32 sends a coinciding signal to the latch control section 33, and with this signal, the latch control section 33 sends the unlock signal to the lock unit 40 to lock the key electrically.

According to this control unit 30, when the detected fingerprint data coincides with any one of the registered fingerprint data, the fingerprint verifying section 32 sends any of an identification code of the coincided registered fingerprint data, the detected fingerprint data and the coincided registered fingerprint data to the unlock record storing section 34, and the unlock record storing section 34 stores the same. The unlock record storing section 34 includes a data function or a clock function. If the data function or the clock function displayed on the display section 36 was set by operating a date/time setting section 37, any of the identification code, the detected fingerprint data and the coincided registered fingerprint data is stored together with the date or time whose coincidence was confirmed.

An identification code, a detected fingerprint data or a coincided registered fingerprint data are displayed on the display section 36 by retrieving by the unlock record retrieving section 35. Therefore, if the date/time setting section 37 is operated to set date or time when the system is installed for example, it is possible to confirm date or time when the system was first used and unlock record retroactively, when an operator of a maker visits for maintenance or the like. Further, if the date/time setting section 37 is operated to renew the date or time at the time of maintenance for example, it is possible to confirm the data and time of the last maintenance and subsequent unlock record retroactively when the operator of the maker visits for replacing the part or body. Further, if the date/time setting section 37 is operated to renew date or time when the part or body is replaced, it is possible to confirm the date or time when the part or body was replaced and subsequent unlock record retroactively when the operator of the maker visits again thereafter.

The lock unit 40 can be locked and unlocked by turning the operation knob 41 from inner side 13 of the door 11.

Figure 6:
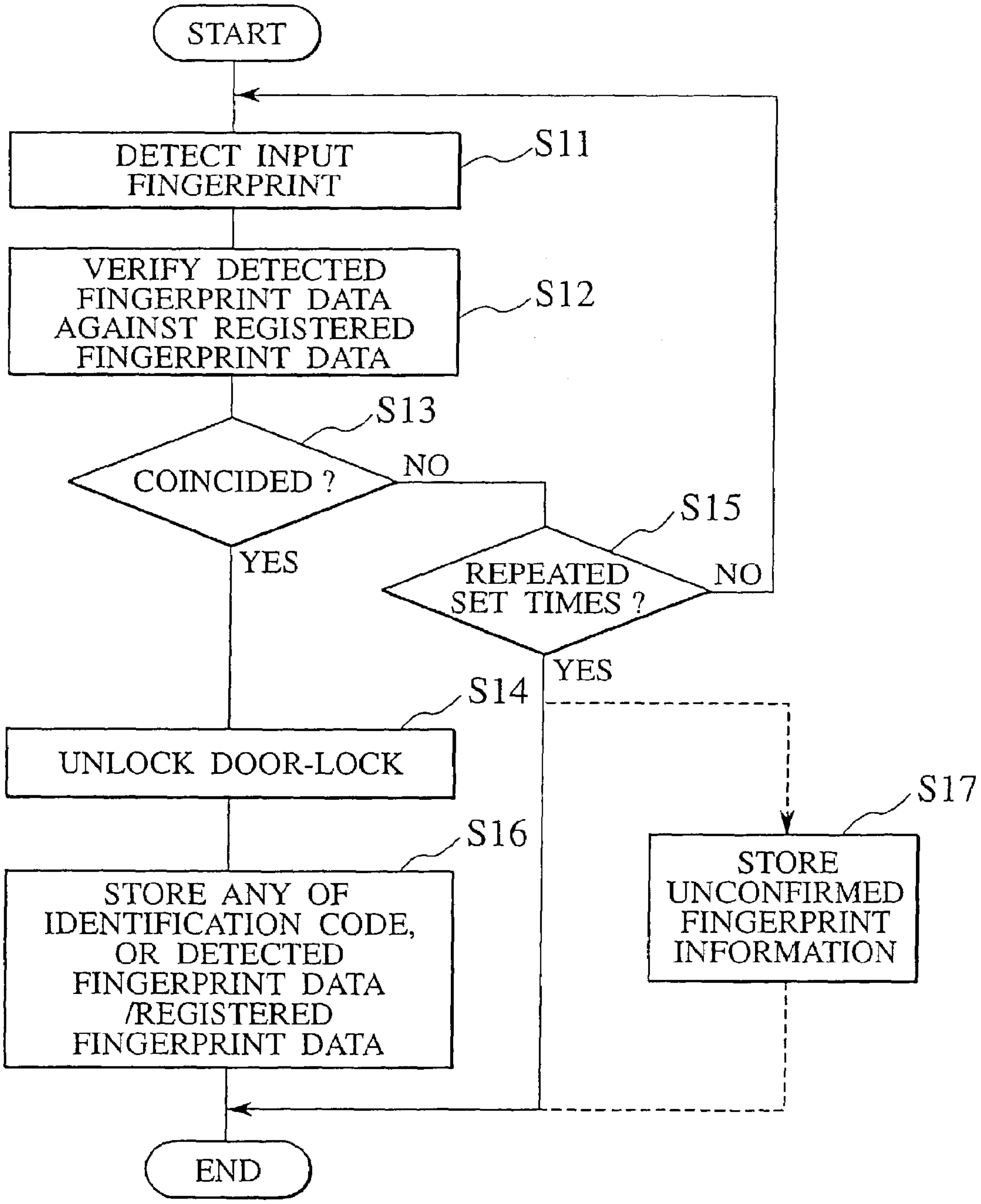
FIG. 6 is a flowchart showing a motion in FIG. 5.

Next, the operation of the embodiment will be explained using a flowchart shown in FIG. 6. When a user is outside 12 of the door 11 and the door-lock is to be unlocked, first, the cover 24 of the operation unit 20 is opened, the user puts his or her finger on the fingerprint input surface 25 and inputs the fingerprint data. With this operation, the fingerprint detecting section (fingerprint sensor) 22 detects the fingerprint data input to the fingerprint input section 21 (step S11).

Then, the detected fingerprint data is sent to the fingerprint verifying section 32 of the control unit 30 from the fingerprint detecting section (fingerprint sensor) 22, and the fingerprint verifying section 32 verifies the fingerprint data against fingerprint data which were previously registered in the fingerprint resister section 31 (step S12).

If the detected fingerprint data coincided with any one of the registered fingerprint data (YES in step S13), the lock unit 40 receives the unlock signal from the latch control section 33 to unlock the door-lock electrically (step S14). At that time, it is preferable to inform of the unlock by a buzzer.

On the other hand, if the detected fingerprint data did not coincide with the registered fingerprint data (NO in step S13), input of the fingerprint data is again required up to a preset times (e.g., three times) (step S15). At that time, it is preferable to inform the user to again input the fingerprint data by a warning buzzer. When it was judged that the input was repeated preset times, the unlock operation is completed.

A procedure (step S17) to store a fingerprint data detected in this case or the operated time in the unlock record storing section 34 as an unconfirmed fingerprint data, or to register the same in the fingerprint resister section 31 may be added. With this step, the unconfirmed fingerprint data and the later-described unconfirmed fingerprint can be verified when the unlock record is searched in the future.

Further, when the lock unit 40 unlocked the door-lock electrically (step S14), the fingerprint verifying section 32 sends any of the identification code of the coincided registered fingerprint data, the detected fingerprint data and the coincided registered fingerprint data to the unlock record storing section 34 and the latter stores the same (step S16).

The unlock record storing section 34 stores a set date or time together with any of the identification code of the coincided registered fingerprint data, the detected fingerprint data and the coincided registered fingerprint data. Therefore, it is possible to confirm the unlock record any time having date or time after installation by retrieving the record by the unlock record retrieving section 35. Further, together with this, it is possible to confirm the unconfirmed fingerprint and its time concerning the unlocking operation registered in step S17 at a later data.

For example, if the date/time setting section 37 is operated to set date or time when the system is installed, it is possible to confirm date or time when the system was first used and unlock record retroactively, when an operator of a maker visits for maintenance or the like.

Further, if the date/time setting section 37 is operated to renew the date or time at the time of maintenance for example, it is possible to confirm the data and time of the last maintenance and subsequent unlock record retroactively when the operator of the maker visits for replacing the part or body.

Further, if the date/time setting section 37 is operated to renew date or time when the part or body is replaced, it is possible to confirm the date or time when the part or body was replaced and subsequent unlock record retroactively when the operator of the maker visits again thereafter.

In this embodiment, a fingerprint data and an identification code which specifies the fingerprint data are registered in the fingerprint resister section 31, and an unlock record is recorded using the identification code. Therefore, a memory capacity of the unlock record storing section 34 may be much smaller than a memory capacity of the fingerprint resister section 31. However, an embodiment of the present invention is not limited to the above-described embodiment, and if there is enough memory capacity, it is possible to register only the fingerprint data in the fingerprint resister section 31 without using the identification code.

Although the invention is applied to the door 11 provided on the doorway 10 of the building in this embodiment, the invention is not limited to this, and the invention can be applied to a door or similar structure provided on a doorway of each portion in a building.

According to the embodiment, when the door-lock provided on the doorway is unlocked, an identification system using no normal key that might be copied is employed. Therefore, the lock can be unlocked only by a correct person. Furthermore, since the unlock record of the door is stored together with date or time that can be set, it is possible to always confirm an unlock record after installation, an unlock record after maintenance, an unlock record after replacement of parts or body, and the like. Thus, efficiency and reliability of security management can be enhanced.

The invention claimed is:

1. A method for unlocking a door-lock provided on a doorway, comprising:

detecting a fingerprint data input to a fingerprint input section disposed outside a door;

verifying the detected fingerprint data against one or more fingerprint data registered and associating the fingerprint data with an identification code;

outputting an unlock signal to unlock the door-lock when it is confirmed that the detected fingerprint data coincided with the registered fingerprint data; and storing only the identification code of the registered fingerprint data that unlocked the door-lock as record information.

2. A method according to claim 1 wherein: the identification code has extremely smaller data capacity than that of each fingerprint data, and a fingerprint data corresponding thereto is specified.

3. A system for unlocking a door-lock provided on a doorway comprising:

a fingerprint detector disposed outside a door detecting a fingerprint data to be input to a fingerprint input section;

a fingerprint verifying device for verifying the fingerprint data detected by the fingerprint detecting means against one or more fingerprint data registered and for associating the fingerprint data with an identification code;

a latch controller for outputting an unlock signal to unlock the door-lock when the fingerprint verifying device confirmed that the detected fingerprint data and the registered fingerprint data coincided with each other; and an unlock record storing device for storing only the identification code of the registered fingerprint data that unlocked the door-lock.

4. A system according to claim 3 wherein: the identification code has extremely smaller data capacity than that of each fingerprint data, and a fingerprint data corresponding thereto is specified.

5. A system according to claim 3 wherein: the fingerprint detector is mounted outside a door; and the fingerprint verifying device, the latch controller and the unlock record storing device are mounted inside the door.

6. A system for unlocking a door-lock provided on a doorway comprising:

a fingerprint detector disposed outside a door detecting a fingerprint data to be input to a fingerprint input section;

a fingerprint verifying device for verifying a fingerprint data detected by the fingerprint detector against one or more previously registered fingerprint data;

a latch controller outputting an unlock signal to unlock the door-lock when the fingerprint verifying device confirmed that the detected fingerprint data and the registered fingerprint data coincided with each other;

an unlock record storing device for only storing fingerprint data that unlocked the door-lock by the latch controller as record data, the unlock record storing device having a data function or a clock function; and date/time setting means for setting the data function or the clock function of the unlock record storing device.

7. A system according to claim 6 wherein: the fingerprint detector is mounted outside a door; and the fingerprint verifying device, the latch controller, the unlock record storing device and the date/time setting means are mounted inside the door.

8. A system for unlocking a door-lock provided on a doorway comprising:

fingerprint detecting means disposed outside a door for detecting fingerprint data to be input to a fingerprint input section;

fingerprint verifying means for verifying fingerprint data detected by the fingerprint detecting means against a plurality of previously registered fingerprint data such that the data could be identified, each of the fingerprint data being registered with name and the fingerprint data being referred to by each identification code having much smaller data amount than the fingerprint data;

a latch controller outputting an unlock signal to unlock the door-lock when the fingerprint verifying device confirmed that the detected fingerprint data and any one of the registered fingerprint data coincided with each other;

unlock record storing means having a data function or a clock function for storing only the identification code of one of the registered fingerprint data; and date/time setting means for setting the data function or the clock function of the unlock record storing means.

9. A system according to claim 8 wherein: the fingerprint detecting means is mounted outside the door; and the fingerprint verifying means, the latch control means, the unlock record storing means and the date/time setting means are mounted inside the door.

* * * * *